United States Patent [19]

Rosenberg et al.

[11] Patent Number: 5,842,117
[45] Date of Patent: Nov. 24, 1998

[54] MOBILE RADIO AERIAL INSTALLATION

[75] Inventors: Uwe Rosenberg, Aspach; Dieter Cluse, Allmersbach/Tal, both of Germany

[73] Assignee: Ant Nachrichtentechnick GmbH, Backnang, Germany

[21] Appl. No.: 591,490

[22] PCT Filed: Jun. 15, 1994

[86] PCT No.: PCT/DE94/00666

§ 371 Date: Apr. 9, 1996

§ 102(e) Date: Apr. 9, 1996

[87] PCT Pub. No.: WO95/02287

PCT Pub. Date: Jan. 19, 1995

[30] Foreign Application Priority Data

Jul. 9, 1993 [DE] Germany ............................ 43 22 863.1

[51] Int. Cl.[6] .............................. H03C 7/02; H04B 1/02; H04B 7/02
[52] U.S. Cl. ........................... 455/101; 455/524; 455/562
[58] Field of Search ................... 455/54.1, 101, 455/103, 132, 133, 272, 277.1, 277.2, 517, 524, 509, 62, 464, 562, 59

[56] References Cited

U.S. PATENT DOCUMENTS

| | | | |
|---|---|---|---|
| 3,114,106 | 12/1963 | McManus | 455/52.1 |
| 3,474,451 | 10/1969 | Abel | 455/103 |
| 3,662,268 | 5/1972 | Gans et al. | 455/89 |
| 3,717,814 | 2/1973 | Gans . | |
| 4,694,484 | 9/1987 | Atkinson et al. | 455/561 |
| 5,034,997 | 7/1991 | Iwasaki | 455/103 |
| 5,048,116 | 9/1991 | Schaeffer | 455/103 |
| 5,175,878 | 12/1992 | Davis et al. | 455/103 |
| 5,220,679 | 6/1993 | Zametzer et al. | 455/82 |
| 5,274,836 | 12/1993 | Lux | 455/103 |
| 5,287,543 | 2/1994 | Wolkstein | 455/103 |
| 5,471,647 | 11/1995 | Gerlach et al. | 455/103 |
| 5,584,058 | 12/1996 | Arnold | 455/103 |
| 5,594,939 | 1/1997 | Curello et al. | 455/103 |

FOREIGN PATENT DOCUMENTS

| | | |
|---|---|---|
| 0214806 | 3/1987 | European Pat. Off. . |
| 0364190 | 4/1990 | European Pat. Off. . |
| 3145992A1 | 6/1982 | Germany . |
| 3423289A1 | 1/1986 | Germany . |
| 3508285C1 | 3/1992 | Germany . |
| 193139 | 11/1982 | Japan ...................................... 455/59 |

OTHER PUBLICATIONS

Lee, William C.Y.; "Mobile Communications Design Fundamentals"; Howard W. Sams & Co., 1986.

Yamada, Yoshihide et al., "Base and Mobile Station Antennas for Land Mobile Radio Systems"; IEICE Transactions, vol. E 74, No. 6, pp. 1547–1555, Jun. 6, 1991.

Clark, John, "Cellular Rural Statistical Area (RSA) Transmit and Receive Combining"; 39th IEEE Vehicular Technology Conference, vol. 1, pp. 354–358, May 1989.

Sawahashi, M. et al; Transmitter Diversity Effect in TDMA/TDD Mobile Radio Transmission; Electronics Letters 28 (1992) 19 Nov., No. 24, Stevenage, Herts., Great Britain.

Primary Examiner—Jacques H. Louis-Jacques
Assistant Examiner—Gertrude Arthur
Attorney, Agent, or Firm—Spencer & Frank

[57] ABSTRACT

An antenna system for small basic transmitter-receiver stations of a communications system for mobile radio operators, with at least one transmission channel and one reception channel which operate on separate frequencies, with at least two antennas which are embodied for redundant reception (reception diversity). Each antenna is used as a transmission antenna for at least one channel. The transmitting operation is carried out without redundancy so that each antenna is fed by a different transmission channel, and the reception diversity is realized so that at least one antenna is set to receive a channel which is associated with the transmission channel of another antenna. The antenna system can be employed in mobile radio networks, in particular the D-net and the E-net. Advantages of the antenna system are low cost, low transmission loss, and high channel flexibility, and above all, the prevention of system interferences as a result of intermodulation products.

11 Claims, 4 Drawing Sheets

MOBILE RADIO AERIAL INSTALLATION

BACKGROUND OF THE INVENTION

The invention relates to an antenna system for small basic or base transmitter-receiver stations of a communications system for mobile radio operators of the type wherein each base transmitter-receiver station is for a system having at least two transmission channels and two associated reception channels, wherein transmitters and receivers of each base transmitter-receiver station operate on separate frequencies, and with at least two antennas which are embodied for redundant reception, or of the type wherein each base transmitter-receiver station is for a system with at least one transmission channel and one reception channel associated with this transmission channel, wherein the transmitter and receiver of the base transmitter-receiver station operate on separate frequencies, with at least two antennas which are embodied for redundant reception.

Antenna systems of this kind have been disclosed for use in mobile radio communication systems. One of these antenna systems is based on a three-antenna solution, see FIG. 1, wherein one of the antennas is used exclusively as a transmitting antenna, wherein the channels to be transmitted are combined by means of diplexers or coupler networks and are fed into the transmitting antenna. The two other antennas are used only for receiving, wherein each antenna receives all channels and wherein the antennas are affixed so that the reception of the antennas is independent and consequently the desired redundancy is guaranteed.

Another known antenna system uses only two antennas, see FIG. 2, wherein the one antenna is used as a combined transmitting and receiving antenna and the other is used exclusively as a receiving antenna for the redundant reception of the channels operated. The transmission and reception signals of the combined antenna are separated by a corresponding diplexer. In this embodiment, the transmission channels are also to be combined via combination networks of frequency filters or couplers before they are supplied to the antenna.

The combination networks which are necessary for this have a few fundamental disadvantages. Combination networks which are based on filters allow only a minimal channel spacing, for example three times the channel raster (600 kHz to 200 kHz). Despite the use of high quality dielectric resonators, these filters additionally have a not inconsiderable attenuation, e.g., up to 2.5 dB at 1850 MHZ. As a rule, these filters are tuned to a fixed channel frequency and can only be re-tuned to other channel frequencies with a coupled mechanical drive. This process therefore does not allow a rapid change of channel frequencies as is often desired in modern systems. FIG. 3 shows a channel combination network with filters, and it can be clearly seen how large and complex a system of this kind, with monitoring and tuning control, turns out to be.

In contrast, combination networks based on hybrids are very compact, permit a very narrow channel spacing, and also allow a rapid change of channel frequencies in the system, since tuning is no longer necessary. However, they have a systemrelated high transmission loss: In the four-channel combination network with 3 dB couplers according to FIG. 4, a power loss of more than 6 dB is obtain ed for each channel.

A further disadvantage of the known antenna systems consists in that when feeding a plurality of transmission signals to a transmitting antenna, intermodulation signals are produced which can impair the functioning of the system. The probability that these intermodulation products end up on the frequency bands of reception channels increases exponentially with the number of transmission channels fed in. Furthermore, the interference output also increases very sharply with the number of transmission channels. With the two-antenna embodiment (FIG. 2), this turns out to be particularly disadvantageous because in this case the signals reach the reception amplifier without isolation, while with the three-antenna embodiment according to FIG. 1, an antenna decoupling of approximately 30 dB can be taken into account. Therefore the more expensive three-antenna embodiment is preferable in many uses.

German Patent 35 08 285 discloses a radio cutover point for a mobile radio network wherein an even number of omnidirectional antennas each with transmitter-receiver sets are provided as an antenna system, which are disposed evenly distributed on the circumference of a circle, and wherein the receivers of the transmitter-receiver sets are embodied as diversity receivers, each pair of whose omnidirectional antennas of the antenna system are used as receiving antennas for receiving an incoming signal in two ways and an even number of transmitters are mutually made available to each of the omnidirectional antennas of the antenna system.

A high capacity digital mobile radio system is described in German Patent Publication 31 45 992, wherein the digital fixed station includes a multitude of antenna elements which operate with space diversity in both the receiving direction and the transmitting direction.

It is common to both mobile radio systems that they operate in time division multiplex and change over for alternating transmission or reception operation by means of switches.

SUMMARY OF THE INVENTION

The object of the present invention is to provide an antenna system of the kind mentioned at the beginning, which even when operating on a plurality of channels, prevent s an interference of the system as a result of intermodulation products and which has a high channel flexibility and low transmission loss. Furthermore, the antenna system is intended to be as inexpensive as possible.

This object generally is attained by an antenna system for a base transmitter-receiver station of a communications system for mobile radio operators, with at least two transmission channels and two reception channels associated with the transmission channels, wherein transmitters and receivers of the basic transmitter-receiver stations operate on separate frequencies, with at least two antennas which are embodied for redundant reception, and wherein each antenna is used as a transmission antenna for at least one channel, the transmitting operation is carried out without redundancy so that each antenna is fed by a different transmission channel, and at least one antenna is set for the redundant reception of that channel which is fed to another antenna as the transmission channel.

The above object likewise generally is achieved by an antenna system for a base transmitter-receiver station of a communications system for mobile radio operators, with at least one transmission channel and one reception channel associated with this transmission channel, wherein transmitter and receiver of the base transmitter-receiver stations operate on separate frequencies, with at least two antennas which are embodied for redundant reception, each antenna is used as a transmission antenna for at least one channel, for at least one channel, the transmission operation is also carried out with redundancy and at least one antenna is set for the redundant reception of that channel, which is transmitted as a transmission channel by a different antenna. Advantageous embodiments of the invention ensue from the claims and disclosure.

The antenna system according to the invention makes it possible to operate on a plurality of channels and has a high channel flexibility as well as low transmission losses, which in any case are lower than those of known systems. It is even more advantageous that with the antenna system according to the invention, interference as a result of intermodulation products is not only reduced, but is also prevented in practical application.

This not only has an effect when used in the mobile radio network D (DMCS 900), but also in the planned E-net. In the D-net, the reception range is 890 to 915 MHZ and the transmission range is 935 to 960 MHZ, therefore at a band width of 25 MHZ and a spacing of 20 MHZ, 5 MHZ are endangered.

In the E-net, the reception range is 1710 to 1785 MHZ and the transmission range is 1805 to 1880 MHZ, at a band width of 75 MHZ and a spacing of 20 MHZ, here, in contrast, 55 MHZ are endangered. Intermodulation products which are comprised of three carriers have a particularly critical effect in conventional antenna systems, since these products have higher energy components.

The advantage of the present antenna system lies that these intermodulation products can be totally prevented and that an interference of the system by other two-carrier products can be as good as ruled out, even for the E-net.

BRIEF DESCRIPTION OF THE DRAWINGS

The invention will be described in detail below by use of drawing figures wherein.

DETAILED DESCRIPTION OF THE PREFERRED EMBODIMENTS

Figure 5A:
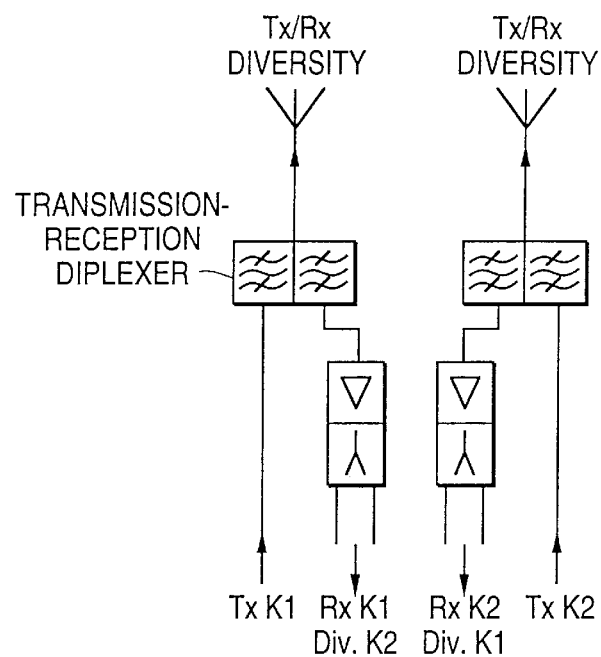

In FIG. 5a, the antenna system is comprised of two antennas, each of which is connected to a diplexer which separates the transmission and reception signals. Respectively one transmission channel K1 and K2 is supplied to both antennas, while the signals of both channels are received by each antenna. In this embodiment, a dissipative combination network is no longer necessary for the two transmission channels; this produces a gain of approximately 3 dB. Furthermore, absolutely no intermodulation products can be produced.

Figure 5B:
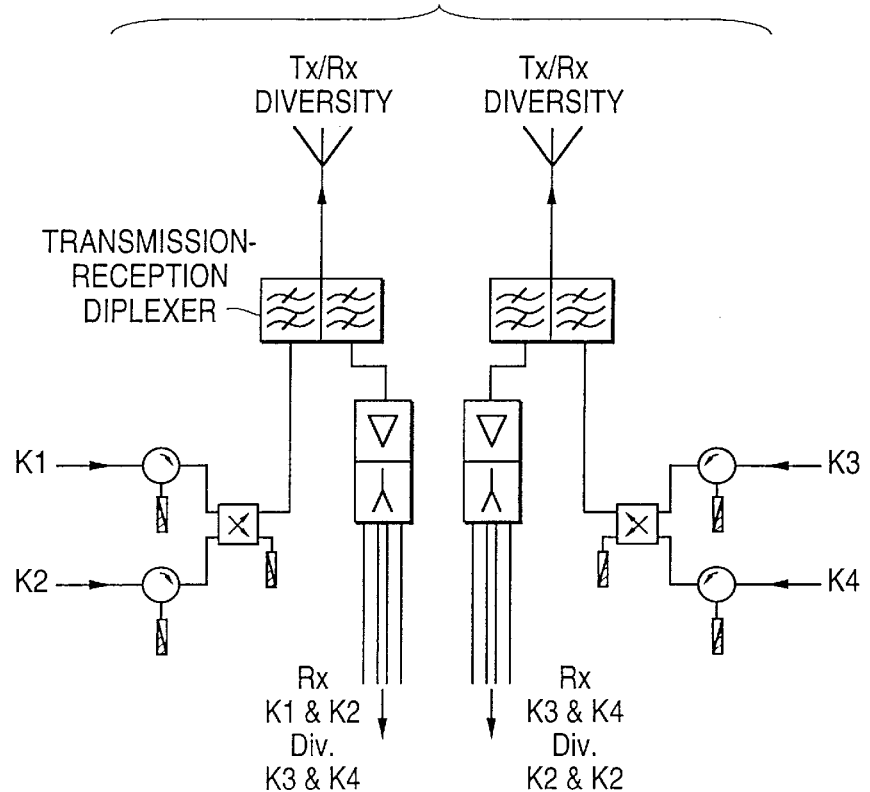

If more than two channels are operated, the transmission channels can be distributed to the two antennas. FIG. 5b shows an arrangement for four channels, wherein each pair of transmission channels is connected to an antenna. In this case, the two transmission channels which are associated with an antenna are combined by a 3 dB coupler in order to then be supplied to the transmission-reception diplexer. Because of the combination of channels, the transmission loss does in fact increase by 3 dB, but is still more than 3 dB lower than in conventional embodiments with coupler combination networks which likewise make a full channel flexibility possible.

In the embodiment according to FIG. 5b, intermodulation products could now also occur since in fact two power transmitters are operated on one antenna; however, an interference of the station can be very simply prevented by means of suitable allocation of the transmission channels to the two antennas. Furthermore, with two transmitters the number of possible intermodulation products is essentially lower than with four transmitters in conventional antenna systems. In contrast, a suitable allocation of two transmission channels is essentially easier to plan than such an allocation of four transmission channels to one antenna.

As in the two-channel example of FIG. 5a, both of the antennas receive all four channels and consequently guarantee the redundant reception of the station.

A interesting version of an antenna system according to the invention is one with three antennas, which are each supplied by a transmission channel and which each receive both of the other channels. In this case, all transmission channels operate at the highest power, expensive combination networks with increased transmission loss are no longer necessary, and if each antenna receives all three channels, a double redundancy is achieved.

Figure 1:
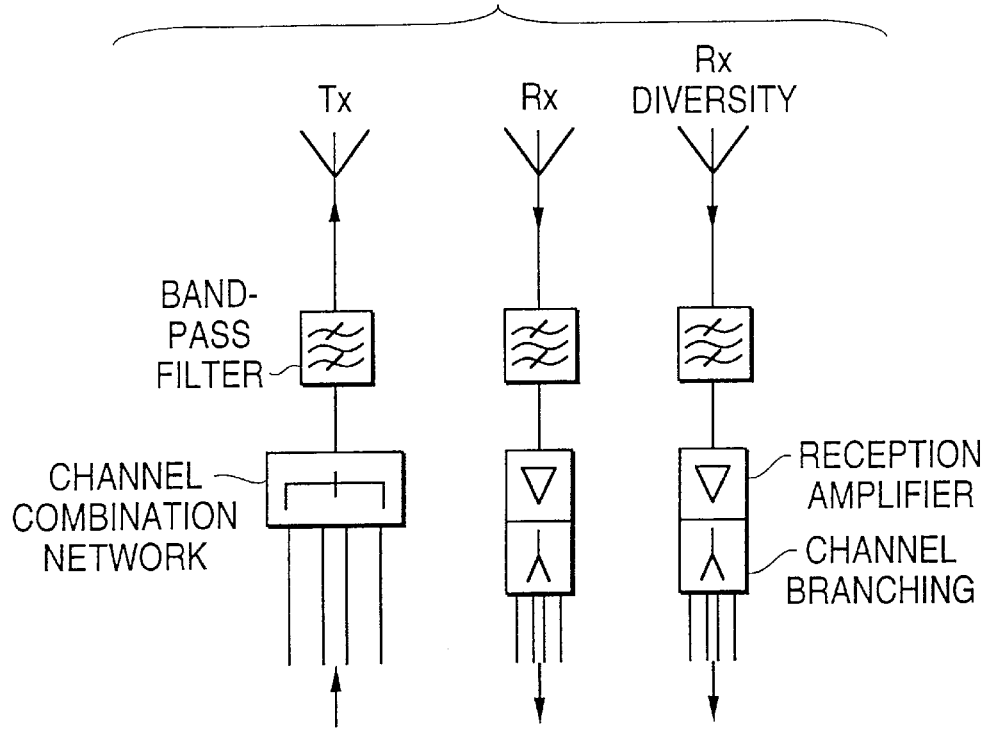
FIGS. 1 and 2 are schematic illustrations of known antenna systems of the type to which the present invention relates.
Figure 2:
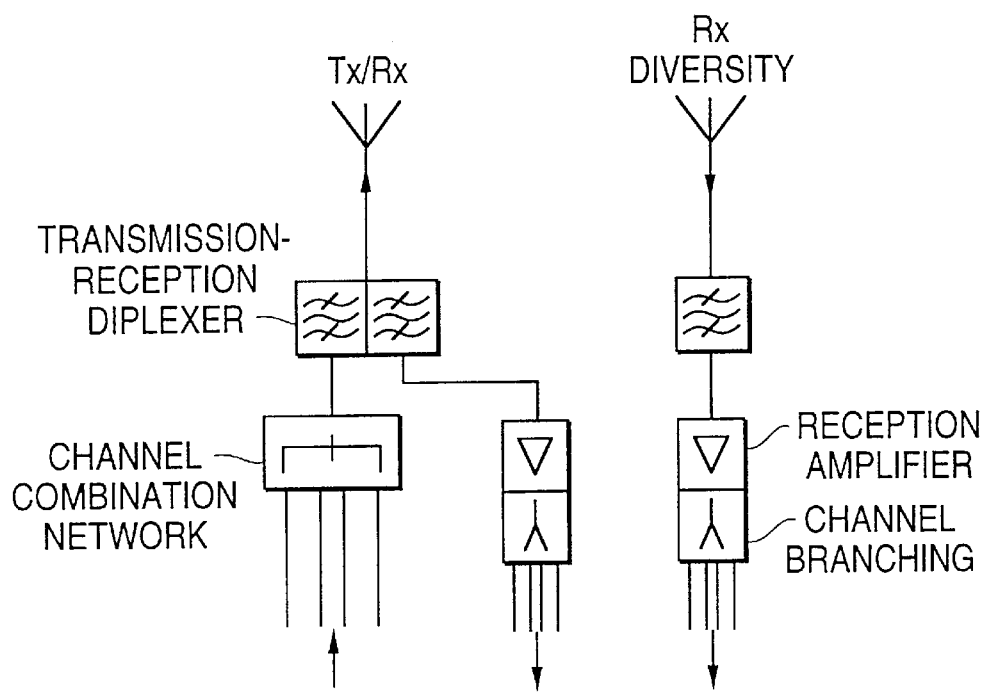
Figure 3:
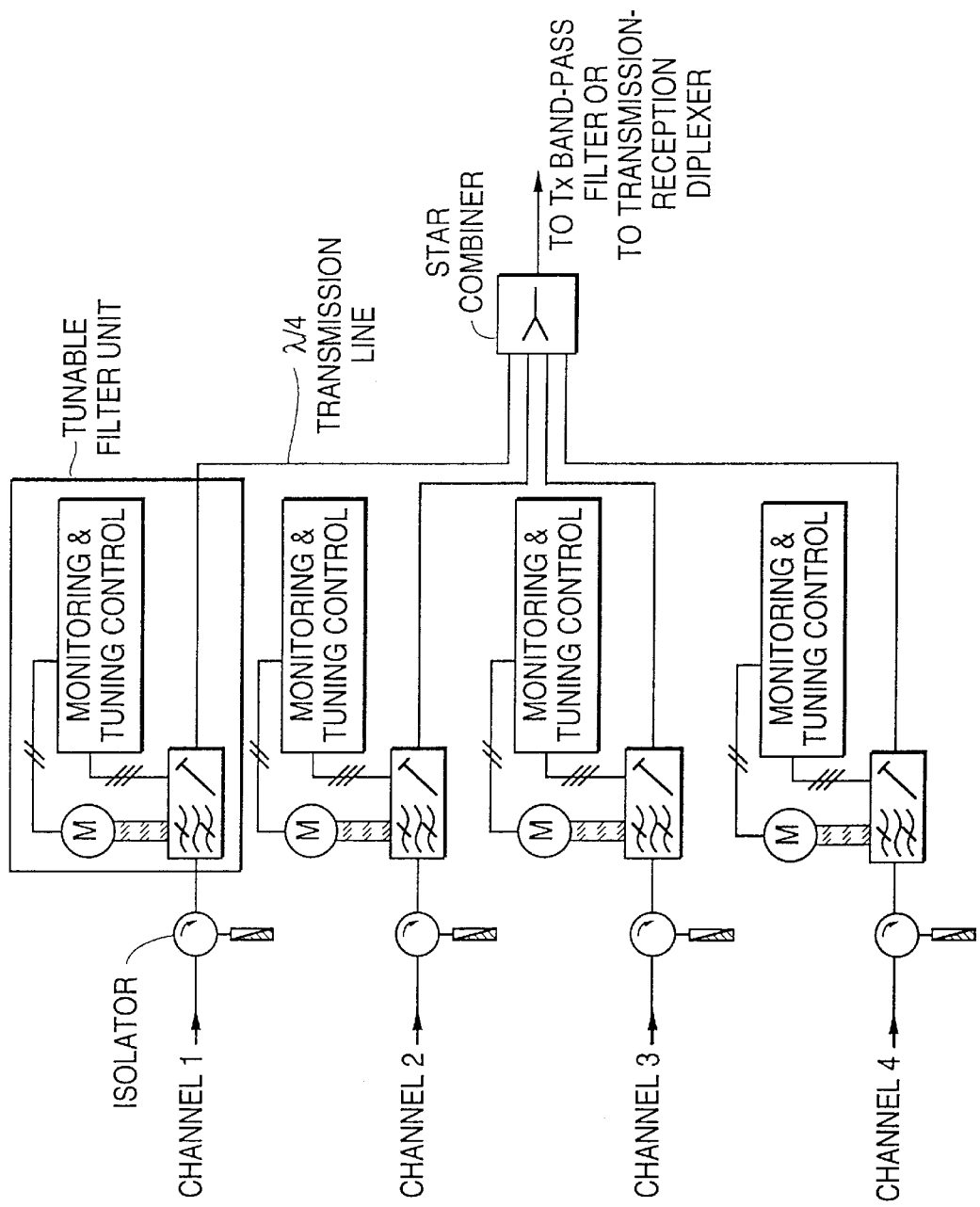
FIG. 3 is a schematic illustration of a channel combination network with filters.
Figure 4:
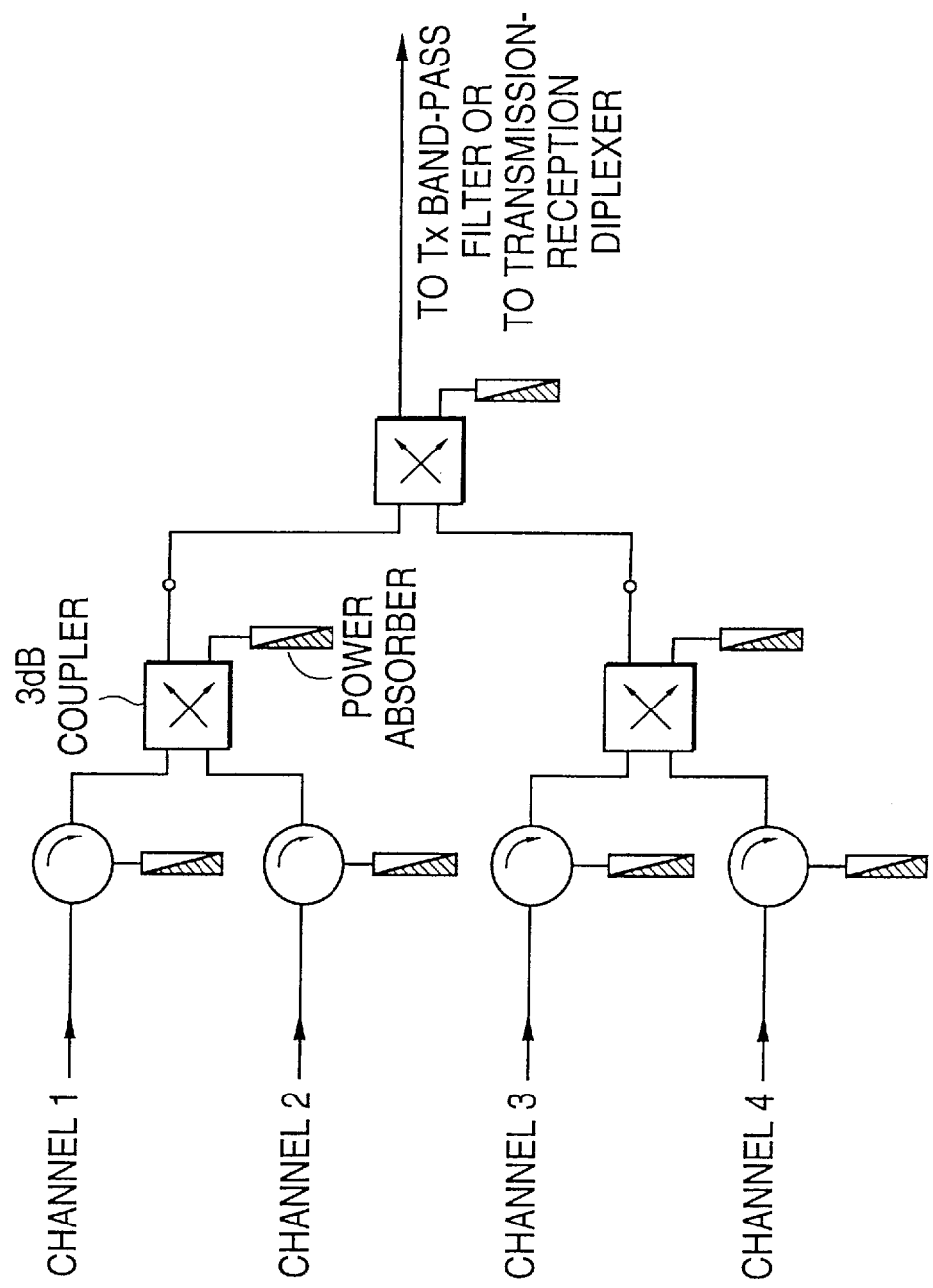
FIG. 4 is a schematic illustration of a channel combination network with couplers, and, FIGS. 5a and 5b are schematic diagrams illustrating first and second respective exemplary embodiments of the invention.

Even when more than four channels are intended to be operated, a three-antenna or multiple-antenna system according to the invention is suitable, wherein each antenna is assigned up to two transmission channels. A six-channel system with three antennas consequently has the advantage of a transmission loss of the transmission channels which is up to 6 dB lower, and the advantage that intermodulation products are prevented while with a combination of six transmission channels in one transmission antenna according to FIG. 1, a powerful interference occurs because of unavoidable intermodulation products.

We claim:

1. An antenna system for a base transmitter-receiver station of a communications system for mobile radio operators, with at least two transmission channels and two associated reception channels, wherein: each base transmitter-receiver station has transmitters and receivers which operate on separate frequencies, and at least two antennas which are embodied for redundant reception; each antenna is used as a transmission antenna for at least one channel; the transmitting operation is carried out without redundancy so that each antenna is fed by a different transmission channel; and, at least one antenna is set for the redundant reception of that channel which is fed to another antenna as the transmission channel.

2. The antenna system according to claim 1, wherein at least one antenna is set to receive a channel which is transmitted by it.

3. The antenna system according to claim 1 with three antennas, wherein each antenna is set to receive the channels transmitted by the other two antennas.

4. The antenna system according to claim 1 for a two-channel base transmitter-receiver station with two antennas, wherein each antenna is fed one transmission channel and is set to receive both channels.

5. The antenna system according to claim 1 for a four channel base transmitter-receiver station with two antennas, wherein each antenna is fed two transmission channels and is set to receive all four channels.

6. The antenna system according to claim 1 with two antennas and three transmission channels, wherein one antenna is fed two of the transmission channels and the other antenna is fed one transmission channel, which latter antenna can be used for broadcasting functions.

7. The antenna system according to claim 1 with more than one transmission channel per antenna, and wherein the transmission channels are combined via coupler combination networks.

8. The antenna system according to claim 1, wherein the separation of the transmission and reception signals is carried out by diplexers.

9. An antenna system for a base transmitter-receiver station of a communications system for mobile radio operators, with at least one transmission channel and one reception channel associated with this transmission channel, wherein a transmitter and a receiver of the base transmitter-receiver station operate on separate frequencies, with at least two antennas which are embodied for redundant reception; each antenna is used as a transmission antenna for at least one channel for at least one channel, the transmission operation is also carried out with redundancy; and, at least one antenna is set for the redundant reception of that channel, which is transmitted as a transmission channel by a different antenna.

10. The antenna system according to claim 9 with more than one transmission channel per antenna, wherein the transmission channels are combined via coupler combination networks.

11. The antenna system according to claim 9, wherein the separation of the transmission and reception signals is carried out by diplexers.

\* \* \* \* \*